July 4, 1961 J. F. WOOD 2,991,332

PHONOGRAPH PICKUP

Filed Aug. 8, 1956

Inventor:
John F. Wood
By Graf, Nierman & Burmeister
Attorneys 2,991,332

PHONOGRAPH PICKUP

John F. Wood, Buchanan, Mich., assignor to Electro-Voice, Incorporated, Buchanan, Mich., a corporation of Indiana Filed Aug. 8, 1956, Ser. No. 602,726
12 Claims. (Cl. 179—100.41)

The present invention relates generally to electromechanical phonographs, and more specifically to a phonograph pickup having means to select one of two styli. This application is a continuation in part of Patent No. 2,793,254, issued May 21, 1957.

Since the development of microgroove records, it has become desirable to provide phonograph pickups with two styli, and means to select one of the two styli. One of the styli is designed for use with the standard groove-width records, and the other stylus is designed for use with microgroove-width records. It is one of the objects of the present invention to provide an improved simple and inexpensive phonograph pickup with a pair of styli and means to select the desired stylus.

Prolonged use of a phonograph stylus causes the stylus to wear due to friction with phonograph records. A worn stylus will injure records and fail to reproduce the sound from the record with the fidelity possible with a stylus of the proper shape. Also, a phonograph cartridge may require replacement, and it is often advantageous to replace both the stylus and the cartridge at the same time. For this reason, phonograph cartridge and stylus assemblies are manufactured which may be plugged into a cartridge holder. It is a further object of the present invention to provide a novel and improved cartridge holder for a cartridge having two styli, and means to select one of the two cartridge styli.

Further objects and advantages of the present invention will become apparent from a further reading of this disclosure, particularly when viewed in the light of the drawings, in which.

Figure 1:
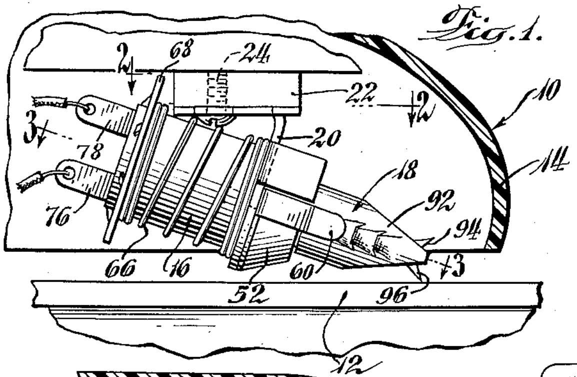
FIGURE 1 is a sectional view of a reproduction arm of a phonograph illustrating in elevation a phonograph cartridge and holder constructed according to the teachings of the present invention.
Figure 7:
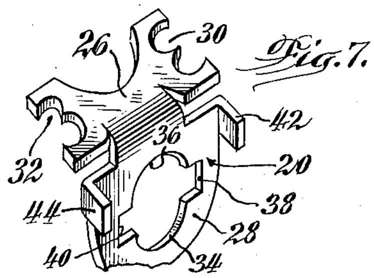
FIGURE 7 is an isometric view of the mounting bracket which constitutes a portion of the cartridge holder shown in FIGURES 1 through 6.
Figure 4:
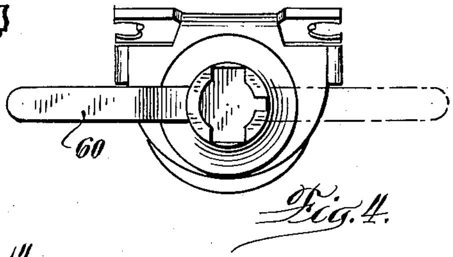
FIGURE 4 is a front elevational view of the cartridge holder shown in FIGURES 1 through 3 with the cartridge removed.
Figure 2:
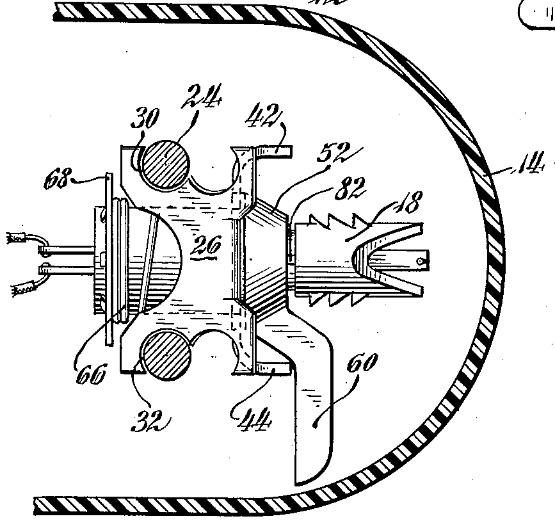
FIGURE 2 is a sectional view of the phonograph reproducing arm taken along the line 2—2 of FIGURE 1.
Figure 5:
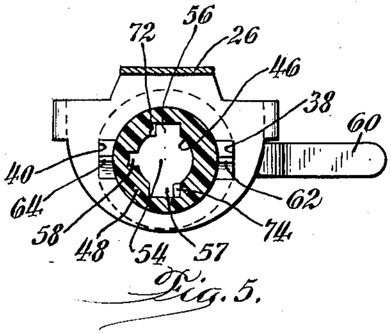
FIGURE 5 is a sectional view taken along the line 5—5 of FIGURE 3, the cartridge being removed.
Figure 3:
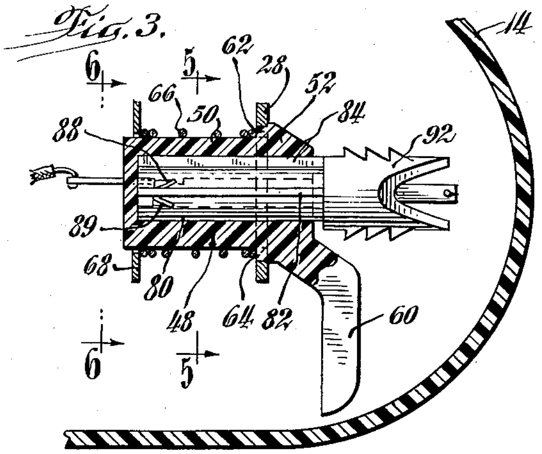
FIGURE 3 is a sectional view taken along the line 3—3 of FIGURE 1, the cartridge being shown in elevation.
Figure 6:
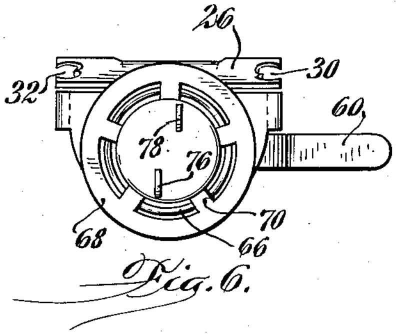
FIGURE 6 is an elevational view taken along the line 6—6 of FIGURE 3.

As illustrated in the figures, the reproducing arm 10 of a phonograph rests upon a disc record 12 and includes a shell 14, a cartridge holder 16, and a cartridge 18. The cartridge holder 16 has a mounting bracket 20 which is secured by screws 24 to a mounting plate 22 fastened within the shell 14 of the arm 10. The bracket 20 has a mounting plate 26 and a face plate 28, the mounting plate 26 having a pair of indentions 30 and 32 on opposite sides thereof to accommodate the screws 24. The face plate 28 of the bracket 20 is disposed at an angle of between 65 and 70 degrees relative to the mounting plate 26 so that the styli are properly oriented relative to the record 12 when the mounting plate is disposed parallel to the record 12. The face plate 28 has a central aperture 34 which has an annular central portion 36 and a pair of rectangular recess portions 38 and 40 on an axis parallel to the mounting plate 26 and traversing the center of the annular portion 36 of the aperture 34. The face plate 28 is also provided with a pair of ribs 42 and 44 which extend normally therefrom on opposite sides of the aperture 34 on a line parallel to the mounting plate 26 and disposed between the line of the recesses 38 and 40 and the mounting plate 26.

The cartridge 18 is disposed within a cavity 46 in a tubular member 48 constructed of electrically insulating material, such as polyethylene plastic. The member 48 has a cylindrical portion 50 extending from a flange 52, the cavity 46 extending into the cylindrical portion 50 from the flanged end of the member 48. The cavity 46 has an annular central portion 54, and two rectangular recesses 56 and 57 parallel to the axis of the cavity 46 and on opposite sides thereof. In addition, a slot 58 is disposed in the cylindrical portion 48 approximately midway between the two recesses 56 and 57, and the slot 58 forms a keyway for the cartridge 18 to properly orient the cartridge when disposed in the cartridge holder 16.

The member 48 is also provided with an arm 60 which extends outwardly from the flange 52 and forms a lever arm for rotation of the member 48 in the bracket 20. The arm 60 is rotatable between the two ribs 42 and 44, and the two ribs form rotational stops. In addition, the flange 52 is provided with a pair of ribs 62 and 64 on opposite sides thereof confronting a cylindrical portion of the member 48, and these ribs 62 and 64 are adapted to be disposed within the recesses 38 and 40 in the face plate 28 of the mounting bracket 20. The ribs 62 and 64 are provided with tapered surfaces to permit removal of the ribs 62 and 64 more readily from the recesses 38 and 40. A helical spring 66 is disposed about the cylindrical portion of the member 48 and abuts the flange 52 at one end and at the other end a self-locking washer 68 which is inserted over the closed end of the cylindrical portion 50 of the member 48, the washer 68 having a plurality of spaced protruding fins 70 which grab the cylindrical portion 50 of the member 48 to retain the washer 68 in place. In this manner, the spring 66 places a bias on the member 48 relative to the face plate 28 of the bracket 20 to retain the flange 52 in engagement with the face plate 28.

A pair of electrical contacts 72 and 74 are mounted in the cavity 46 adjacent to the closed end thereof, one of said contacts 72 extending in the form of a strip into the recess 56 on one side of the cavity, and the other contact 74 extending in the form of a strip into the other recess 57 on the other side of the cavity. Both of the contacts 72 and 74 extend through the closed end of the member 48 to form terminals 76 and 78 exterior to the member 48.

The cartridge 18 has a generally cylindrical portion 80 which is disposed within the cavity 46, the portion 80 being provided with a pair of ribs 82 on opposite sides thereof and a rib 84 midway between the ribs 82. Each of the ribs 82 is provided with an outwardly extending electrical contact 88 in the form of a pair of outwardly flaring plates 88 and 89 and the plates 88 and 89 abut the contacts 72 and 74 disposed within the cavity 46. The cartridge 18 is also provided with a head 92 which contains a pair of styli 94 and 96 which abut the surface of the record 12. Since the cartridge is conventional in the art, it will not be further described.

It is to be noted that the cartridge 18 may be inserted into the cartridge holder 16, the rib 84 acting as a keyway so that the proper stylus 94 or 96 confronts the record 12 in a particular position of the arm 60. If it is desired to replace the cartridge and styli, it is only necessary to unplug this unit and plug in a replacement. Further, the helical spring 66 maintains the flange 52 of the member 48 in abutment against the face plate 28 of the bracket 20 when the ribs 62 and 64 are in the recesses 38 and 40. As a result, the cartridge 18 is held securely in place and is not permitted undue motion relative to the arm 10 during operation. Once the arm 60 is rotated in a direction away from the adjacent rib 42 or 44, and the ribs 62 and 64 are unseated from the recesses 38 and 40, the arm 60 rotates freely since the bearing surface is only the two ribs 62 and 64. Further, the cartridge holder here described is relatively free from wear, since it employs but a single moving element. Also, the cartridge holder is very readily assembled since only the spring 66 and a selflocking washer need be inserted over the closed end of the member 48 in order to completely assemble the unit, the contacts 72 and 74 having first been disposed within the cavity 50 before assembling.

The man skilled in the art will readily devise many modifications of the structure herein disclosed, and will foresee many additional applications for this device. It is therefore intended that the scope of the present invention be not limited by the foregoing disclosure, but rather only by the appended claims.

The invention claimed is:

1. A phonograph pickup comprising a bracket having an aperture therein having a cylindrical central portion and a pair of generally rectangular recesses on opposite sides thereof, a generally cylindrical member journalled within the aperture having an outwardly extending flange at one end provided with an arm extending outwardly therefrom and a pair of ribs extending axially from the flange on opposite sides of the member and confronting the cylindrical portion of the member, said ribs being adapted to seat within the rectangular recesses and said member having a cavity extending therein from the flanged end thereof, a first pair of electrical contacts carried by the member and disposed within the recess, and an electro-mechanical transducer having a pair of spaced styli adapted to contact the phonograph record disposed within the cavity, said transducer having a second pair of electrical contacts on its outer surface abutting the first pair of contacts.

2. A phonograph cartridge holder comprising a bracket having an aperture therein having a cylindrical central portion and a pair of generally rectangular recesses on opposite sides thereof, a generally cylindrical member journalled within the aperture having an outwardly extending flange at one end provided with a pair of ribs extending axially from the flange on opposite sides of the member and confronting the cylindrical portion of the member, said ribs being adapted to seat within the rectangular recesses and said member having a cavity extending therein from the flanged end thereof, and a pair of electrically conducting contacts mounted within the cavity and electrically insulated from each other.

3. A phonograph pickup comprising the elements of claim 2 in combination with an electro-mechanical transducer removably disposed within the cavity having a pair of styli adapted to contact a record, said transducer having a pair of electrical contacts insulated from each other, one of said contacts abutting each of the electrical contacts mounted within the cavity.

4. A phonograph pickup comprising a bracket having an aperture therein having a cylindrical central portion and a pair of generally rectangular recesses on opposite sides thereof, a generally cylindrical member journalled within the aperture having an outwardly extending flange at one end provided with a pair of ribs extending axially from the flange on opposite sides of the member and confronting the cylindrical portion of the member, said ribs being adapted to seat within the rectangular recess and said member having a cavity extending therein from the flanged end thereof, a first pair of electrically conducting contacts mounted within the cavity and electrically insulated from each other, an electro-mechanical transducer having a pair of spaced styli adapted to contact a phonograph record removably disposed within the cavity, said transducer having a second pair of electrical contacts on the exterior surface thereof abutting the first pair of contacts, a helical spring disposed about the member having one end abutting the bracket, and means secured to the cylindrical portion of the member abutting the other end of the spring, whereby a spring bias is placed upon the member holding the flange in contact with the bracket.

5. A phonograph cartridge holder comprising a bracket having a mounting plate adapted to be secured to the arm of a phonograph and a face plate disposed at an angle 65 to 70 degrees therefrom having a central aperture with an annular portion and a pair of generally rectangular recessed portions extending from the annular portion on opposite sides thereof on an axis parallel to the mounting plate, said face plate also having a pair of ribs extending from the plate and mounted on opposite sides of the aperture on an axis parallel to the axis of the recessed portions between said axis and the mounting plate, a member constructed of electrically insulating material having a cylindrical portion with a cavity extending axially therein from one end journalled within the aperture of the bracket, said member having a flange extending outwardly from said cavitied end having a projecting rib on the side confronting the cylindrical portion thereof and an arm extending outwardly normal to the axis of the cylindrical portion from the portion of the flange adjacent to the ridge, a self locking washer disposed about the end of the cylindrical portion of the member opposite the flange, a helical spring disposed about the cylindrical portion of the member abutting the face plate of the bracket at one end and the self locking washer at the other end, and a pair of electrical contacts mounted within the cavity and electrically insulated from each other, said contacts extending to the exterior of the cavity through the end of the cylindrical portion of the member opposite the flange.

6. A phonograph cartridge holder comprising the elements in claim 5 wherein the cavity of the member is provided with three recesses, two of the recesses being on opposite sides thereof and the third recess being disposed approximately midway between the first two recesses, and the electrical contacts being disposed within the two recesses disposed on opposite sides of the cavity.

7. A phonograph cartridge holder and cartridge comprising the elements in claim 5 wherein the cavity of the member is provided with three recesses, two of the recesses being on opposite sides thereof and the third recess being disposed approximately midway between the first two recesses, and the electrical contacts being disposed within the two recesses disposed on opposite sides of the cavity, and a cartridge having three ribs disposed about a cylindrical portion thereof disposed within the cavity of the member, two of the ribs being on opposite sides of the cylindrical portion of the cartridge and the third rib being disposed approximately midway between the two ribs, said cartridge having a pair of electrical contacts mounted thereto in alignment with the two ribs on opposite sides thereof, said contacts abutting the electrical contacts within the cavity, and said cartridge also having a pair of styli on opposite sides thereof aligned with the two ridges on opposite sides of the cylindrical portion thereof.

8. A phonograph pickup comprising a bracket having a first flat portion with an aperture therein and a second portion extending from the first portion and adapted to be secured to the arm of a phonograph, a hollow sleeve provided with an outwardly protruding flange journaled within the aperture of the bracket with the flange abutting one side of the bracket, said sleeve having an arm extending outwardly therefrom to form a handle and a first pair of contacts mounted thereon and disposed within the hollow sleeve, and an electromechanical transducer mounted with the hollow sleeve and extending from the flanged end of the sleeve, said transducer having a second pair of electrical contacts abutting the electrical contacts on the sleeve and two styli disposed on different sides thereof adapted to contact a phonograph record.

9. A phonograph pickup comprising the elements of claim 8 in combination with means for maintaining the flange of the sleeve in abutment with the bracket comprises a helical spring disposed about the sleeve abutting the bracket at one end, and a lock washer disposed above the sleeve abutting the other end of the spring.

10. A phonograph pickup comprising the elements of claim 8 in combination with a first means to stop rotation of the sleeve in the bracket, and a second means to stop rotation of the sleeve in the bracket, the first means positioning one of the styli of the electromechanical transducer to confront the surface of the record and the second means positioning the second stylus to confront the record surface.

11. A turnover mechanism for use with a two styli phonograph pickup cartridge adapted to ride on a record comprising a bracket having a first flat portion with an aperture therein and a second portion extending from the first portion and adapted to be secured to the arm of a phonograph, a hollow sleeve provided with an outwardly protruding flange journaled within the aperture of the bracket with the flange abutting one side of the bracket, said sleeve having a pair of electrical contacts disposed on the interior surface of the sleeve and adapted to engage a pair of electrical contacts on the phonograph pickup cartridge, said sleeve also having an arm extending outwardly therefrom to form a handle, a first means to stop rotation of the sleeve in the bracket, and a second means to stop rotation of the sleeve in the bracket, the first means orienting the sleeve with respect to the bracket to position one of the styli of the phonograph pickup within the sleeve to confront the surface of a record, and the second means orienting the sleeve to so position the second stylus of the phonograph pickup.

12. A phonograph pickup comprising, in combination: a turnover mechanism having a sleeve having an outward ly extending arm, a first pair of electrical contacts disposed within the sleeve, means for rotatably mounting the sleeve on a supporting member, and stop means for yieldably retaining the sleeve in either one of two rotatable positions; and an electro-mechanical transducer having one end slidably disposed within the sleeve, said transducer having a second pair of electrical contacts on said end slidably engaging the first pair of electrical contacts, and a pair of styli mounted on the opposite end of the transducer, only one of said styli being adapted to engage a record for each stopped position of the sleeve.

References Cited in the file of this patent

UNITED STATES PATENTS

| | | |
|---|---|---|
| 2,699,470 | Koren | Jan. 11, 1955 |
| 2,717,929 | Klingener | Sept. 13, 1955 |
| 2,742,530 | Mayer | Apr. 17, 1956 |
| 2,793,254 | Wood | May 21, 1957 |